UNITED STATES PATENT OFFICE.

HENRY W. DAVIS, OF WEATHERFORD, TEXAS.

METHOD OF MANUFACTURING A MEDICAMENT.

No. 906,694.　　　　Specification of Letters Patent.　　　Patented Dec. 15, 1908.

Application filed March 24, 1906.　Serial No. 307,879.

*To all whom it may concern:*

Be it known that I, HENRY W. DAVIS, a citizen of the United States, residing at Weatherford, in the county of Parker and State of Texas, have invented new and useful Improvements in Methods of Manufacturing Medicaments, of which the following is a specification.

This invention relates to a method of preparing a medicament, and has for its object to provide a method in the use of which a medicament may be produced which possesses superior advantages in the treatment of throat troubles where inflammation is present, such, for example, as croup, diphtheria, or tonsilitis.

In proceeding according to my invention I employ the lower joints or shanks of cattle. These have the hides removed therefrom, and the hoofs thereof are then dipped in boiling water and removed. After thoroughly washing the shanks they are then placed in water and boiled constantly for approximately fourteen hours. After such boiling the liquid is allowed to cool and the oil which has been extracted from the shanks is skimmed from the top of the body of water. Such oil is then boiled for a further period of one hour to evaporate any water that may be therein and to purify the same, after which said purified oil is mixed with a terpene hydrocarbon, preferably spirits of turpentine. In mixing the ingredients I take about seven and one-half ounces, by measure, of the oil and one-half ounce of the spirits of turpentine.

The oil obtained from the shanks by boiling as described, is of a light yellow color and very heavy and dense. It differs greatly from "neat's foot-oil" in respect to its great curative and medicinal properties, and these differences I attribute to the length of boiling which, as stated above, should approximate fourteen hours.

The properties of turpentine as an emollient and otherwise are well known and its use for the cure or treatment of coughs, colds, sore throats and the like, usually by external application are also well known. By combining the turpentine with the oil obtained as above described, I produce a compound which presents the useful properties of turpentine and in addition the curative and medicinal properties of my improved oil; and I have demonstrated by numerous trials that my compound will invariably cure throat troubles of the character indicated.

I claim:

A method of manufacturing a medicament which consists in removing the hides and hoofs from the shanks of cattle, boiling the shanks in water for a period of fourteen hours to extract the oil from the shanks, then cooling the liquid, then separating the oil from the liquid, then boiling the oil for a period of one hour and then admixing with the oil turpentine in the proportions of one - half ounce turpentine to seven and one - half ounces of oil.

In testimony whereof I have hereunto set my hand in presence of two subscribing witnesses.

HENRY W. DAVIS.

Witnesses:
　BERNARD MARTIN,
　CLAUDE EUGENE FRAZIER.